United States Patent
Fujii et al.

(10) Patent No.: US 10,190,708 B2
(45) Date of Patent: Jan. 29, 2019

(54) RESIN-MADE PIPE JOINT

(71) Applicant: Nippon Pillar Packing Co., Ltd., Osaka-shi (JP)

(72) Inventors: Makoto Fujii, Osaka (JP); Masaki Miyamoto, Osaka (JP); Toshihide Iida, Osaka (JP); Tomoyuki Koike, Osaka (JP); Atsushi Nakano, Osaka (JP); Daisuke Urata, Osaka (JP)

(73) Assignee: Nippon Pillar Packing Co., Ltd., Osaka-shi (JP)

( * ) Notice: Subject to any disclaimer, the term of this patent is extended or adjusted under 35 U.S.C. 154(b) by 201 days.

(21) Appl. No.: 15/323,657

(22) PCT Filed: Sep. 17, 2015

(86) PCT No.: PCT/JP2015/076427
§ 371 (c)(1),
(2) Date: Jan. 3, 2017

(87) PCT Pub. No.: WO2016/052223
PCT Pub. Date: Apr. 7, 2016

(65) Prior Publication Data
US 2017/0159854 A1 Jun. 8, 2017

(30) Foreign Application Priority Data
Sep. 30, 2014 (JP) ................. 2014-200822

(51) Int. Cl.
| F16L 19/02 | (2006.01) |
| F16L 47/04 | (2006.01) |
| F16L 33/22 | (2006.01) |

(52) U.S. Cl.
CPC .......... F16L 19/0212 (2013.01); F16L 47/04 (2013.01); F16L 33/223 (2013.01)

(58) Field of Classification Search
CPC ...... F16L 19/0212; F16L 47/04; F16L 33/223
See application file for complete search history.

(56) References Cited

U.S. PATENT DOCUMENTS

| 5,743,572 A | 4/1998 | Nishio |
| 6,045,164 A | 4/2000 | Nishio |
| (Continued) | | |

FOREIGN PATENT DOCUMENTS

| EP | 1262702 A1 * 12/2002 ............ F16L 19/041 |
| JP | 10-54489 A 2/1998 |
| (Continued) | |

OTHER PUBLICATIONS

International Search Report dated Nov. 10, 2015 in PCT/JP2015/076427 filed Sep. 17, 2015.

*Primary Examiner* — James M Hewitt, II
(74) *Attorney, Agent, or Firm* — Oblon, McClelland, Maier & Neustadt, L.L.P.

(57) ABSTRACT

A resin-made pipe joint enhancing sealing property between a joint body and a sleeve. The joint body and the sleeve are produced by using a fluorine resin. A sealing portion which seals between the inner circumferential surface of an inserting portion of the sleeve and the outer circumferential surface of the inner cylinder portion is formed by press-inserting the inserting portion into a groove portion of the joint body. When, with respect to the inserting and groove portions, an insertion rate of the inserting portion to the groove portion is indicated by X, and a multiplying factor of the radial width of the inserting portion to the radial width of the groove portion is indicated by Y, the resin-made pipe joint has the insertion rate and multiplying factor which are within a range defined by following Expressions (1) and (2):

$$Y=-0.218X+1.218 \quad (1)$$

and $$Y=-0.67X+1.67. \quad (2)$$

8 Claims, 14 Drawing Sheets

(56) References Cited

U.S. PATENT DOCUMENTS

| | | | |
|---|---|---|---|
| 2002/0167169 A1 | 11/2002 | Nishio | |
| 2003/0085569 A1* | 5/2003 | Nishio | F16L 47/04 285/331 |
| 2006/0157975 A1* | 7/2006 | Fujii | F16L 19/028 285/247 |

FOREIGN PATENT DOCUMENTS

| | | | |
|---|---|---|---|
| JP | 11-218272 A | 8/1999 | |
| JP | 2000-283372 A | 10/2000 | |
| JP | 2006-161830 A | 6/2006 | |
| WO | WO-2014181592 A1 * | 11/2014 | F16L 19/028 |

* cited by examiner

FIG. 5

| MULTI-PLYING FACTOR | INSERTION RATE | RADIAL WIDTH OF INSERTING PORTION | RADIAL WIDTH OF GROOVE PORTION | PRESS INSERTION LENGTH OF INSERTING PORTION | DEPTH OF GROOVE PORTION | COM-PRESSION RATE | OCCURRENCE/ NONOCCURRENCE OF LEAKAGE IN INITIAL CONNECTION | OCCURRENCE/ NONOCCURRENCE OF LEAKAGE IN RECONNECTION | EXISTENCE/ NONEXISTENCE OF POSSIBILITY OF REMAINING OF SLEEVE |
|---|---|---|---|---|---|---|---|---|---|
| D1/D2 | L1/L2 | D1 mm | D2 mm | L1 mm | L2 mm | (D1-D2)/D1 % | | | |
| 1.004 | 0.9 | 1.004 | 1.00 | 2.25 | 2.50 | 0.43 | OCCURRENCE | OCCURRENCE | NONEXISTENCE |
| 1.009 | 0.9 | 1.009 | 1.00 | 2.25 | 2.50 | 0.87 | OCCURRENCE | OCCURRENCE | NONEXISTENCE |
| 1.013 | 0.9 | 1.013 | 1.00 | 2.25 | 2.50 | 1.29 | NONOCCURRENCE | OCCURRENCE | NONEXISTENCE |
| 1.017 | 0.9 | 1.017 | 1.00 | 2.25 | 2.50 | 1.72 | NONOCCURRENCE | OCCURRENCE | NONEXISTENCE |
| 1.022 | 0.9 | 1.022 | 1.00 | 2.25 | 2.50 | 2.14 | NONOCCURRENCE | NONOCCURRENCE | NONEXISTENCE |
| 1.026 | 0.9 | 1.026 | 1.00 | 2.25 | 2.50 | 2.56 | NONOCCURRENCE | NONOCCURRENCE | NONEXISTENCE |
| 1.031 | 0.9 | 1.031 | 1.00 | 2.25 | 2.50 | 2.98 | NONOCCURRENCE | NONOCCURRENCE | NONEXISTENCE |
| 1.035 | 0.9 | 1.035 | 1.00 | 2.25 | 2.50 | 3.39 | NONOCCURRENCE | NONOCCURRENCE | NONEXISTENCE |
| 1.040 | 0.9 | 1.040 | 1.00 | 2.25 | 2.50 | 3.81 | NONOCCURRENCE | NONOCCURRENCE | NONEXISTENCE |
| 1.044 | 0.9 | 1.044 | 1.00 | 2.25 | 2.50 | 4.22 | NONOCCURRENCE | NONOCCURRENCE | NONEXISTENCE |
| 1.049 | 0.9 | 1.049 | 1.00 | 2.25 | 2.50 | 4.63 | NONOCCURRENCE | NONOCCURRENCE | NONEXISTENCE |
| 1.053 | 0.9 | 1.053 | 1.00 | 2.25 | 2.50 | 5.05 | NONOCCURRENCE | NONOCCURRENCE | NONEXISTENCE |
| 1.058 | 0.9 | 1.058 | 1.00 | 2.25 | 2.50 | 5.46 | NONOCCURRENCE | NONOCCURRENCE | NONEXISTENCE |
| 1.062 | 0.9 | 1.062 | 1.00 | 2.25 | 2.50 | 5.87 | NONOCCURRENCE | NONOCCURRENCE | NONEXISTENCE |
| 1.067 | 0.9 | 1.067 | 1.00 | 2.25 | 2.50 | 6.28 | NONOCCURRENCE | NONOCCURRENCE | NONEXISTENCE |
| 1.072 | 0.9 | 1.072 | 1.00 | 2.25 | 2.50 | 6.69 | NONOCCURRENCE | NONOCCURRENCE | EXISTENCE |
| 1.076 | 0.9 | 1.076 | 1.00 | 2.25 | 2.50 | 7.10 | NONOCCURRENCE | NONOCCURRENCE | EXISTENCE |
| 1.081 | 0.9 | 1.081 | 1.00 | 2.25 | 2.50 | 7.51 | NONOCCURRENCE | NONOCCURRENCE | EXISTENCE |
| 1.086 | 0.9 | 1.086 | 1.00 | 2.25 | 2.50 | 7.93 | NONOCCURRENCE | NONOCCURRENCE | EXISTENCE |
| 1.091 | 0.9 | 1.091 | 1.00 | 2.25 | 2.50 | 8.34 | NONOCCURRENCE | NONOCCURRENCE | EXISTENCE |

FIG. 6

| MULTI-PLYING FACTOR | INSERTION RATE | RADIAL WIDTH OF INSERTING PORTION | RADIAL WIDTH OF GROOVE PORTION | PRESS INSERTION LENGTH OF INSERTING PORTION | DEPTH OF GROOVE PORTION | COM-PRESSION RATE | OCCURRENCE/NONOCCURRENCE OF LEAKAGE IN INITIAL CONNECTION | OCCURRENCE/NONOCCURRENCE OF LEAKAGE IN RECONNECTION | EXISTENCE/NONEXISTENCE OF POSSIBILITY OF REMAINING OF SLEEVE |
|---|---|---|---|---|---|---|---|---|---|
| D1/D2 | L1/L2 | D1 mm | D2 mm | L1 mm | L2 mm | (D1-D2)/D1 % | | | |
| 1.009 | 0.8 | 1.009 | 1.00 | 2.00 | 2.50 | 0.87 | OCCURRENCE | OCCURRENCE | NONEXISTENCE |
| 1.017 | 0.8 | 1.017 | 1.00 | 2.00 | 2.50 | 1.72 | OCCURRENCE | OCCURRENCE | NONEXISTENCE |
| 1.026 | 0.8 | 1.026 | 1.00 | 2.00 | 2.50 | 2.55 | NONOCCURRENCE | OCCURRENCE | NONEXISTENCE |
| 1.035 | 0.8 | 1.035 | 1.00 | 2.00 | 2.50 | 3.38 | NONOCCURRENCE | OCCURRENCE | NONEXISTENCE |
| 1.044 | 0.8 | 1.044 | 1.00 | 2.00 | 2.50 | 4.19 | NONOCCURRENCE | NONOCCURRENCE | NONEXISTENCE |
| 1.053 | 0.8 | 1.053 | 1.00 | 2.00 | 2.50 | 4.99 | NONOCCURRENCE | NONOCCURRENCE | NONEXISTENCE |
| 1.061 | 0.8 | 1.061 | 1.00 | 2.00 | 2.50 | 5.78 | NONOCCURRENCE | NONOCCURRENCE | NONEXISTENCE |
| 1.070 | 0.8 | 1.070 | 1.00 | 2.00 | 2.50 | 6.57 | NONOCCURRENCE | NONOCCURRENCE | NONEXISTENCE |
| 1.079 | 0.8 | 1.079 | 1.00 | 2.00 | 2.50 | 7.34 | NONOCCURRENCE | NONOCCURRENCE | NONEXISTENCE |
| 1.088 | 0.8 | 1.088 | 1.00 | 2.00 | 2.50 | 8.10 | NONOCCURRENCE | NONOCCURRENCE | NONEXISTENCE |
| 1.097 | 0.8 | 1.097 | 1.00 | 2.00 | 2.50 | 8.86 | NONOCCURRENCE | NONOCCURRENCE | NONEXISTENCE |
| 1.106 | 0.8 | 1.106 | 1.00 | 2.00 | 2.50 | 9.61 | NONOCCURRENCE | NONOCCURRENCE | NONEXISTENCE |
| 1.115 | 0.8 | 1.115 | 1.00 | 2.00 | 2.50 | 10.35 | NONOCCURRENCE | NONOCCURRENCE | NONEXISTENCE |
| 1.125 | 0.8 | 1.125 | 1.00 | 2.00 | 2.50 | 11.08 | NONOCCURRENCE | NONOCCURRENCE | NONEXISTENCE |
| 1.134 | 0.8 | 1.134 | 1.00 | 2.00 | 2.50 | 11.81 | NONOCCURRENCE | NONOCCURRENCE | NONEXISTENCE |
| 1.143 | 0.8 | 1.143 | 1.00 | 2.00 | 2.50 | 12.54 | NONOCCURRENCE | NONOCCURRENCE | EXISTENCE |
| 1.153 | 0.8 | 1.153 | 1.00 | 2.00 | 2.50 | 13.26 | NONOCCURRENCE | NONOCCURRENCE | EXISTENCE |
| 1.162 | 0.8 | 1.162 | 1.00 | 2.00 | 2.50 | 13.98 | NONOCCURRENCE | NONOCCURRENCE | EXISTENCE |
| 1.172 | 0.8 | 1.172 | 1.00 | 2.00 | 2.50 | 14.69 | NONOCCURRENCE | NONOCCURRENCE | EXISTENCE |
| 1.182 | 0.8 | 1.182 | 1.00 | 2.00 | 2.50 | 15.40 | NONOCCURRENCE | NONOCCURRENCE | EXISTENCE |

FIG. 7

| MULTI-PLYING FACTOR | INSERTION RATE | RADIAL WIDTH OF INSERTING PORTION | RADIAL WIDTH OF GROOVE PORTION | PRESS INSERTION LENGTH OF INSERTING PORTION | DEPTH OF GROOVE PORTION | COM-PRESSION RATE | OCCURRENCE/ NONOCCURRENCE OF LEAKAGE IN INITIAL CONNECTION | OCCURRENCE/ NONOCCURRENCE OF LEAKAGE IN RECONNECTION | EXISTENCE/ NONEXISTENCE OF POSSIBILITY OF REMAINING OF SLEEVE |
|---|---|---|---|---|---|---|---|---|---|
| D1/D2 | L1/L2 | D1 mm | D2 mm | L1 mm | L2 mm | (D1-D2)/D1 % | | | |
| 1.017 | 0.6 | 1.017 | 1.00 | 1.50 | 2.50 | 1.72 | OCCURRENCE | OCCURRENCE | NONEXISTENCE |
| 1.035 | 0.6 | 1.035 | 1.00 | 1.50 | 2.50 | 3.37 | OCCURRENCE | OCCURRENCE | NONEXISTENCE |
| 1.052 | 0.6 | 1.052 | 1.00 | 1.50 | 2.50 | 4.98 | NONOCCURRENCE | OCCURRENCE | NONEXISTENCE |
| 1.070 | 0.6 | 1.070 | 1.00 | 1.50 | 2.50 | 6.54 | NONOCCURRENCE | OCCURRENCE | NONEXISTENCE |
| 1.087 | 0.6 | 1.087 | 1.00 | 1.50 | 2.50 | 8.05 | NONOCCURRENCE | NONOCCURRENCE | NONEXISTENCE |
| 1.105 | 0.6 | 1.105 | 1.00 | 1.50 | 2.50 | 9.51 | NONOCCURRENCE | NONOCCURRENCE | NONEXISTENCE |
| 1.123 | 0.6 | 1.123 | 1.00 | 1.50 | 2.50 | 10.94 | NONOCCURRENCE | NONOCCURRENCE | NONEXISTENCE |
| 1.141 | 0.6 | 1.141 | 1.00 | 1.50 | 2.50 | 12.32 | NONOCCURRENCE | NONOCCURRENCE | NONEXISTENCE |
| 1.158 | 0.6 | 1.158 | 1.00 | 1.50 | 2.50 | 13.67 | NONOCCURRENCE | NONOCCURRENCE | NONEXISTENCE |
| 1.176 | 0.6 | 1.176 | 1.00 | 1.50 | 2.50 | 14.99 | NONOCCURRENCE | NONOCCURRENCE | NONEXISTENCE |
| 1.194 | 0.6 | 1.194 | 1.00 | 1.50 | 2.50 | 16.27 | NONOCCURRENCE | NONOCCURRENCE | NONEXISTENCE |
| 1.213 | 0.6 | 1.213 | 1.00 | 1.50 | 2.50 | 17.53 | NONOCCURRENCE | NONOCCURRENCE | NONEXISTENCE |
| 1.231 | 0.6 | 1.231 | 1.00 | 1.50 | 2.50 | 18.76 | NONOCCURRENCE | NONOCCURRENCE | NONEXISTENCE |
| 1.249 | 0.6 | 1.249 | 1.00 | 1.50 | 2.50 | 19.96 | NONOCCURRENCE | NONOCCURRENCE | NONEXISTENCE |
| 1.268 | 0.6 | 1.268 | 1.00 | 1.50 | 2.50 | 21.13 | NONOCCURRENCE | NONOCCURRENCE | NONEXISTENCE |
| 1.287 | 0.6 | 1.287 | 1.00 | 1.50 | 2.50 | 22.28 | NONOCCURRENCE | NONOCCURRENCE | EXISTENCE |
| 1.306 | 0.6 | 1.306 | 1.00 | 1.50 | 2.50 | 23.41 | NONOCCURRENCE | NONOCCURRENCE | EXISTENCE |
| 1.325 | 0.6 | 1.325 | 1.00 | 1.50 | 2.50 | 24.52 | NONOCCURRENCE | NONOCCURRENCE | EXISTENCE |
| 1.344 | 0.6 | 1.344 | 1.00 | 1.50 | 2.50 | 25.61 | NONOCCURRENCE | NONOCCURRENCE | EXISTENCE |
| 1.364 | 0.6 | 1.364 | 1.00 | 1.50 | 2.50 | 26.68 | NONOCCURRENCE | NONOCCURRENCE | EXISTENCE |

FIG. 8

| MULTI-PLYING FACTOR | INSERTION RATE | RADIAL WIDTH OF INSERTING PORTION | RADIAL WIDTH OF GROOVE PORTION | PRESS INSERTION LENGTH OF INSERTING PORTION | DEPTH OF GROOVE PORTION | COMPRESSION RATE | OCCURRENCE/ NONOCCURRENCE OF LEAKAGE IN INITIAL CONNECTION | OCCURRENCE/ NONOCCURRENCE OF LEAKAGE IN RECONNECTION | EXISTENCE/ NONEXISTENCE OF POSSIBILITY OF REMAINING OF SLEEVE |
|---|---|---|---|---|---|---|---|---|---|
| D1/D2 | L1/L2 | D1 mm | D2 mm | L1 mm | L2 mm | (D1-D2)/D1 % | | | |
| 1.026 | 0.4 | 1.026 | 1.00 | 1.00 | 2.50 | 2.55 | OCCURRENCE | OCCURRENCE | NONEXISTENCE |
| 1.052 | 0.4 | 1.052 | 1.00 | 1.00 | 2.50 | 4.98 | OCCURRENCE | OCCURRENCE | NONEXISTENCE |
| 1.079 | 0.4 | 1.079 | 1.00 | 1.00 | 2.50 | 7.29 | NONOCCURRENCE | OCCURRENCE | NONEXISTENCE |
| 1.105 | 0.4 | 1.105 | 1.00 | 1.00 | 2.50 | 9.49 | NONOCCURRENCE | OCCURRENCE | NONEXISTENCE |
| 1.131 | 0.4 | 1.131 | 1.00 | 1.00 | 2.50 | 11.60 | NONOCCURRENCE | NONOCCURRENCE | NONEXISTENCE |
| 1.158 | 0.4 | 1.158 | 1.00 | 1.00 | 2.50 | 13.62 | NONOCCURRENCE | NONOCCURRENCE | NONEXISTENCE |
| 1.184 | 0.4 | 1.184 | 1.00 | 1.00 | 2.50 | 15.55 | NONOCCURRENCE | NONOCCURRENCE | NONEXISTENCE |
| 1.211 | 0.4 | 1.211 | 1.00 | 1.00 | 2.50 | 17.41 | NONOCCURRENCE | NONOCCURRENCE | NONEXISTENCE |
| 1.238 | 0.4 | 1.238 | 1.00 | 1.00 | 2.50 | 19.20 | NONOCCURRENCE | NONOCCURRENCE | NONEXISTENCE |
| 1.264 | 0.4 | 1.264 | 1.00 | 1.00 | 2.50 | 20.92 | NONOCCURRENCE | NONOCCURRENCE | NONEXISTENCE |
| 1.292 | 0.4 | 1.292 | 1.00 | 1.00 | 2.50 | 22.57 | NONOCCURRENCE | NONOCCURRENCE | NONEXISTENCE |
| 1.319 | 0.4 | 1.319 | 1.00 | 1.00 | 2.50 | 24.18 | NONOCCURRENCE | NONOCCURRENCE | NONEXISTENCE |
| 1.346 | 0.4 | 1.346 | 1.00 | 1.00 | 2.50 | 25.72 | NONOCCURRENCE | NONOCCURRENCE | NONEXISTENCE |
| 1.374 | 0.4 | 1.374 | 1.00 | 1.00 | 2.50 | 27.22 | NONOCCURRENCE | NONOCCURRENCE | NONEXISTENCE |
| 1.402 | 0.4 | 1.402 | 1.00 | 1.00 | 2.50 | 28.67 | NONOCCURRENCE | NONOCCURRENCE | NONEXISTENCE |
| 1.430 | 0.4 | 1.430 | 1.00 | 1.00 | 2.50 | 30.08 | NONOCCURRENCE | NONOCCURRENCE | EXISTENCE |
| 1.459 | 0.4 | 1.459 | 1.00 | 1.00 | 2.50 | 31.44 | NONOCCURRENCE | NONOCCURRENCE | EXISTENCE |
| 1.487 | 0.4 | 1.487 | 1.00 | 1.00 | 2.50 | 32.77 | NONOCCURRENCE | NONOCCURRENCE | EXISTENCE |
| 1.516 | 0.4 | 1.516 | 1.00 | 1.00 | 2.50 | 34.06 | NONOCCURRENCE | NONOCCURRENCE | EXISTENCE |
| 1.546 | 0.4 | 1.546 | 1.00 | 1.00 | 2.50 | 35.32 | NONOCCURRENCE | NONOCCURRENCE | EXISTENCE |

FIG. 9

| MULTI-PLYING FACTOR | INSERTION RATE | RADIAL WIDTH OF INSERTING PORTION | RADIAL WIDTH OF GROOVE PORTION | PRESS INSERTION LENGTH OF INSERTING PORTION | DEPTH OF GROOVE PORTION | COM-PRESSION RATE | OCCURRENCE/NONOCCURRENCE OF LEAKAGE IN INITIAL CONNECTION | OCCURRENCE/NONOCCURRENCE OF LEAKAGE IN RECONNECTION | EXISTENCE/NONEXISTENCE OF POSSIBILITY OF REMAINING OF SLEEVE |
|---|---|---|---|---|---|---|---|---|---|
| D1/D2 | L1/L2 | D1 mm | D2 mm | L1 mm | L2 mm | (D1-D2)/D1 % | | | |
| 1.031 | 0.3 | 1.031 | 1.00 | 0.75 | 2.50 | 2.96 | OCCURRENCE | OCCURRENCE | NONEXISTENCE |
| 1.061 | 0.3 | 1.061 | 1.00 | 0.75 | 2.50 | 5.76 | OCCURRENCE | OCCURRENCE | NONEXISTENCE |
| 1.092 | 0.3 | 1.092 | 1.00 | 0.75 | 2.50 | 8.40 | NONOCCURRENCE | OCCURRENCE | NONEXISTENCE |
| 1.122 | 0.3 | 1.122 | 1.00 | 0.75 | 2.50 | 10.90 | NONOCCURRENCE | OCCURRENCE | NONEXISTENCE |
| 1.153 | 0.3 | 1.153 | 1.00 | 0.75 | 2.50 | 13.28 | NONOCCURRENCE | NONOCCURRENCE | NONEXISTENCE |
| 1.184 | 0.3 | 1.184 | 1.00 | 0.75 | 2.50 | 15.54 | NONOCCURRENCE | NONOCCURRENCE | NONEXISTENCE |
| 1.215 | 0.3 | 1.215 | 1.00 | 0.75 | 2.50 | 17.69 | NONOCCURRENCE | NONOCCURRENCE | NONEXISTENCE |
| 1.246 | 0.3 | 1.246 | 1.00 | 0.75 | 2.50 | 19.74 | NONOCCURRENCE | NONOCCURRENCE | NONEXISTENCE |
| 1.277 | 0.3 | 1.277 | 1.00 | 0.75 | 2.50 | 21.70 | NONOCCURRENCE | NONOCCURRENCE | NONEXISTENCE |
| 1.309 | 0.3 | 1.309 | 1.00 | 0.75 | 2.50 | 23.58 | NONOCCURRENCE | NONOCCURRENCE | NONEXISTENCE |
| 1.340 | 0.3 | 1.340 | 1.00 | 0.75 | 2.50 | 25.38 | NONOCCURRENCE | NONOCCURRENCE | NONEXISTENCE |
| 1.372 | 0.3 | 1.372 | 1.00 | 0.75 | 2.50 | 27.11 | NONOCCURRENCE | NONOCCURRENCE | NONEXISTENCE |
| 1.404 | 0.3 | 1.404 | 1.00 | 0.75 | 2.50 | 28.78 | NONOCCURRENCE | NONOCCURRENCE | NONEXISTENCE |
| 1.436 | 0.3 | 1.436 | 1.00 | 0.75 | 2.50 | 30.38 | NONOCCURRENCE | NONOCCURRENCE | NONEXISTENCE |
| 1.469 | 0.3 | 1.469 | 1.00 | 0.75 | 2.50 | 31.92 | NONOCCURRENCE | NONOCCURRENCE | NONEXISTENCE |
| 1.502 | 0.3 | 1.502 | 1.00 | 0.75 | 2.50 | 33.41 | NONOCCURRENCE | NONOCCURRENCE | EXISTENCE |
| 1.535 | 0.3 | 1.535 | 1.00 | 0.75 | 2.50 | 34.85 | NONOCCURRENCE | NONOCCURRENCE | EXISTENCE |
| 1.569 | 0.3 | 1.569 | 1.00 | 0.75 | 2.50 | 36.25 | NONOCCURRENCE | NONOCCURRENCE | EXISTENCE |
| 1.603 | 0.3 | 1.603 | 1.00 | 0.75 | 2.50 | 37.60 | NONOCCURRENCE | NONOCCURRENCE | EXISTENCE |
| 1.637 | 0.3 | 1.637 | 1.00 | 0.75 | 2.50 | 38.91 | NONOCCURRENCE | NONOCCURRENCE | EXISTENCE |

FIG. 10

| MULTI-PLYING FACTOR | INSERTION RATE | RADIAL WIDTH OF INSERTING PORTION | RADIAL WIDTH OF GROOVE PORTION | PRESS INSERTION LENGTH OF INSERTING PORTION | DEPTH OF GROOVE PORTION | COM-PRESSION RATE | OCCURRENCE/NONOCCURRENCE OF LEAKAGE IN INITIAL CONNECTION | OCCURRENCE/NONOCCURRENCE OF LEAKAGE IN RECONNECTION | EXISTENCE/NONEXISTENCE OF POSSIBILITY OF REMAINING OF SLEEVE |
|---|---|---|---|---|---|---|---|---|---|
| D1/D2 | L1/L2 | D1 mm | D2 mm | L1 mm | L2 mm | (D1-D2)/D1 % | | | |
| 1.004 | 0.9 | 1.004 | 1.00 | 2.25 | 2.50 | 0.43 | OCCURRENCE | OCCURRENCE | NONEXISTENCE |
| 1.009 | 0.9 | 1.009 | 1.00 | 2.25 | 2.50 | 0.87 | OCCURRENCE | OCCURRENCE | NONEXISTENCE |
| 1.013 | 0.9 | 1.013 | 1.00 | 2.25 | 2.50 | 1.29 | OCCURRENCE | OCCURRENCE | NONEXISTENCE |
| 1.017 | 0.9 | 1.017 | 1.00 | 2.25 | 2.50 | 1.72 | NONOCCURRENCE | OCCURRENCE | NONEXISTENCE |
| 1.022 | 0.9 | 1.022 | 1.00 | 2.25 | 2.50 | 2.14 | NONOCCURRENCE | NONOCCURRENCE | NONEXISTENCE |
| 1.026 | 0.9 | 1.026 | 1.00 | 2.25 | 2.50 | 2.56 | NONOCCURRENCE | NONOCCURRENCE | NONEXISTENCE |
| 1.031 | 0.9 | 1.031 | 1.00 | 2.25 | 2.50 | 2.98 | NONOCCURRENCE | NONOCCURRENCE | NONEXISTENCE |
| 1.035 | 0.9 | 1.035 | 1.00 | 2.25 | 2.50 | 3.39 | NONOCCURRENCE | NONOCCURRENCE | NONEXISTENCE |
| 1.040 | 0.9 | 1.040 | 1.00 | 2.25 | 2.50 | 3.81 | NONOCCURRENCE | NONOCCURRENCE | NONEXISTENCE |
| 1.044 | 0.9 | 1.044 | 1.00 | 2.25 | 2.50 | 4.22 | NONOCCURRENCE | NONOCCURRENCE | NONEXISTENCE |
| 1.049 | 0.9 | 1.049 | 1.00 | 2.25 | 2.50 | 4.63 | NONOCCURRENCE | NONOCCURRENCE | NONEXISTENCE |
| 1.053 | 0.9 | 1.053 | 1.00 | 2.25 | 2.50 | 5.05 | NONOCCURRENCE | NONOCCURRENCE | NONEXISTENCE |
| 1.058 | 0.9 | 1.058 | 1.00 | 2.25 | 2.50 | 5.46 | NONOCCURRENCE | NONOCCURRENCE | NONEXISTENCE |
| 1.062 | 0.9 | 1.062 | 1.00 | 2.25 | 2.50 | 5.87 | NONOCCURRENCE | NONOCCURRENCE | NONEXISTENCE |
| 1.067 | 0.9 | 1.067 | 1.00 | 2.25 | 2.50 | 6.28 | NONOCCURRENCE | NONOCCURRENCE | NONEXISTENCE |
| 1.072 | 0.9 | 1.072 | 1.00 | 2.25 | 2.50 | 6.69 | NONOCCURRENCE | NONOCCURRENCE | NONEXISTENCE |
| 1.076 | 0.9 | 1.076 | 1.00 | 2.25 | 2.50 | 7.10 | NONOCCURRENCE | NONOCCURRENCE | NONEXISTENCE |
| 1.081 | 0.9 | 1.081 | 1.00 | 2.25 | 2.50 | 7.51 | NONOCCURRENCE | NONOCCURRENCE | NONEXISTENCE |
| 1.086 | 0.9 | 1.086 | 1.00 | 2.25 | 2.50 | 7.93 | NONOCCURRENCE | NONOCCURRENCE | EXISTENCE |
| 1.091 | 0.9 | 1.091 | 1.00 | 2.25 | 2.50 | 8.34 | NONOCCURRENCE | NONOCCURRENCE | EXISTENCE |

FIG. 11

| MULTI-PLYING FACTOR | INSERTION RATE | RADIAL WIDTH OF INSERTING PORTION | RADIAL WIDTH OF GROOVE PORTION | PRESS INSERTION LENGTH OF INSERTING PORTION | DEPTH OF GROOVE PORTION | COM-PRESSION RATE | OCCURRENCE/NONOCCURRENCE OF LEAKAGE IN INITIAL CONNECTION | OCCURRENCE/NONOCCURRENCE OF LEAKAGE IN RECONNECTION | EXISTENCE/NONEXISTENCE OF POSSIBILITY OF REMAINING OF SLEEVE |
|---|---|---|---|---|---|---|---|---|---|
| D1/D2 | L1/L2 | D1 mm | D2 mm | L1 mm | L2 mm | (D1-D2)/D1 % | | | |
| 1.009 | 0.8 | 1.009 | 1.00 | 2.00 | 2.50 | 0.87 | OCCURRENCE | OCCURRENCE | NONEXISTENCE |
| 1.017 | 0.8 | 1.017 | 1.00 | 2.00 | 2.50 | 1.72 | OCCURRENCE | OCCURRENCE | NONEXISTENCE |
| 1.026 | 0.8 | 1.026 | 1.00 | 2.00 | 2.50 | 2.55 | OCCURRENCE | OCCURRENCE | NONEXISTENCE |
| 1.035 | 0.8 | 1.035 | 1.00 | 2.00 | 2.50 | 3.38 | NONOCCURRENCE | OCCURRENCE | NONEXISTENCE |
| 1.044 | 0.8 | 1.044 | 1.00 | 2.00 | 2.50 | 4.19 | NONOCCURRENCE | NONOCCURRENCE | NONEXISTENCE |
| 1.053 | 0.8 | 1.053 | 1.00 | 2.00 | 2.50 | 4.99 | NONOCCURRENCE | NONOCCURRENCE | NONEXISTENCE |
| 1.061 | 0.8 | 1.061 | 1.00 | 2.00 | 2.50 | 5.78 | NONOCCURRENCE | NONOCCURRENCE | NONEXISTENCE |
| 1.070 | 0.8 | 1.070 | 1.00 | 2.00 | 2.50 | 6.57 | NONOCCURRENCE | NONOCCURRENCE | NONEXISTENCE |
| 1.079 | 0.8 | 1.079 | 1.00 | 2.00 | 2.50 | 7.34 | NONOCCURRENCE | NONOCCURRENCE | NONEXISTENCE |
| 1.088 | 0.8 | 1.088 | 1.00 | 2.00 | 2.50 | 8.10 | NONOCCURRENCE | NONOCCURRENCE | NONEXISTENCE |
| 1.097 | 0.8 | 1.097 | 1.00 | 2.00 | 2.50 | 8.86 | NONOCCURRENCE | NONOCCURRENCE | NONEXISTENCE |
| 1.106 | 0.8 | 1.106 | 1.00 | 2.00 | 2.50 | 9.61 | NONOCCURRENCE | NONOCCURRENCE | NONEXISTENCE |
| 1.115 | 0.8 | 1.115 | 1.00 | 2.00 | 2.50 | 10.35 | NONOCCURRENCE | NONOCCURRENCE | NONEXISTENCE |
| 1.125 | 0.8 | 1.125 | 1.00 | 2.00 | 2.50 | 11.08 | NONOCCURRENCE | NONOCCURRENCE | NONEXISTENCE |
| 1.134 | 0.8 | 1.134 | 1.00 | 2.00 | 2.50 | 11.81 | NONOCCURRENCE | NONOCCURRENCE | NONEXISTENCE |
| 1.143 | 0.8 | 1.143 | 1.00 | 2.00 | 2.50 | 12.54 | NONOCCURRENCE | NONOCCURRENCE | NONEXISTENCE |
| 1.153 | 0.8 | 1.153 | 1.00 | 2.00 | 2.50 | 13.26 | NONOCCURRENCE | NONOCCURRENCE | NONEXISTENCE |
| 1.162 | 0.8 | 1.162 | 1.00 | 2.00 | 2.50 | 13.98 | NONOCCURRENCE | NONOCCURRENCE | NONEXISTENCE |
| 1.172 | 0.8 | 1.172 | 1.00 | 2.00 | 2.50 | 14.69 | NONOCCURRENCE | NONOCCURRENCE | EXISTENCE |
| 1.182 | 0.8 | 1.182 | 1.00 | 2.00 | 2.50 | 15.40 | NONOCCURRENCE | NONOCCURRENCE | EXISTENCE |

FIG. 12

| MULTI-PLYING FACTOR | INSERTION RATE | RADIAL WIDTH OF INSERTING PORTION | RADIAL WIDTH OF GROOVE PORTION | PRESS INSERTION LENGTH OF INSERTING PORTION | DEPTH OF GROOVE PORTION | COMPRESSION RATE | OCCURRENCE/ NONOCCURRENCE OF LEAKAGE IN INITIAL CONNECTION | OCCURRENCE/ NONOCCURRENCE OF LEAKAGE IN RECONNECTION | EXISTENCE/ NONEXISTENCE OF POSSIBILITY OF REMAINING OF SLEEVE |
|---|---|---|---|---|---|---|---|---|---|
| D1/D2 | L1/L2 | D1 | D2 | L1 | L2 | (D1-D2)/D1 | | | |
| | | mm | mm | mm | mm | % | | | |
| 1.017 | 0.6 | 1.017 | 1.00 | 1.50 | 2.50 | 1.72 | OCCURRENCE | OCCURRENCE | NONEXISTENCE |
| 1.035 | 0.6 | 1.035 | 1.00 | 1.50 | 2.50 | 3.37 | OCCURRENCE | OCCURRENCE | NONEXISTENCE |
| 1.052 | 0.6 | 1.052 | 1.00 | 1.50 | 2.50 | 4.98 | OCCURRENCE | OCCURRENCE | NONEXISTENCE |
| 1.070 | 0.6 | 1.070 | 1.00 | 1.50 | 2.50 | 6.54 | NONOCCURRENCE | OCCURRENCE | NONEXISTENCE |
| 1.087 | 0.6 | 1.087 | 1.00 | 1.50 | 2.50 | 8.05 | NONOCCURRENCE | NONOCCURRENCE | NONEXISTENCE |
| 1.105 | 0.6 | 1.105 | 1.00 | 1.50 | 2.50 | 9.51 | NONOCCURRENCE | NONOCCURRENCE | NONEXISTENCE |
| 1.123 | 0.6 | 1.123 | 1.00 | 1.50 | 2.50 | 10.94 | NONOCCURRENCE | NONOCCURRENCE | NONEXISTENCE |
| 1.141 | 0.6 | 1.141 | 1.00 | 1.50 | 2.50 | 12.32 | NONOCCURRENCE | NONOCCURRENCE | NONEXISTENCE |
| 1.158 | 0.6 | 1.158 | 1.00 | 1.50 | 2.50 | 13.67 | NONOCCURRENCE | NONOCCURRENCE | NONEXISTENCE |
| 1.176 | 0.6 | 1.176 | 1.00 | 1.50 | 2.50 | 14.99 | NONOCCURRENCE | NONOCCURRENCE | NONEXISTENCE |
| 1.194 | 0.6 | 1.194 | 1.00 | 1.50 | 2.50 | 16.27 | NONOCCURRENCE | NONOCCURRENCE | NONEXISTENCE |
| 1.213 | 0.6 | 1.213 | 1.00 | 1.50 | 2.50 | 17.53 | NONOCCURRENCE | NONOCCURRENCE | NONEXISTENCE |
| 1.231 | 0.6 | 1.231 | 1.00 | 1.50 | 2.50 | 18.76 | NONOCCURRENCE | NONOCCURRENCE | NONEXISTENCE |
| 1.249 | 0.6 | 1.249 | 1.00 | 1.50 | 2.50 | 19.96 | NONOCCURRENCE | NONOCCURRENCE | NONEXISTENCE |
| 1.268 | 0.6 | 1.268 | 1.00 | 1.50 | 2.50 | 21.13 | NONOCCURRENCE | NONOCCURRENCE | NONEXISTENCE |
| 1.287 | 0.6 | 1.287 | 1.00 | 1.50 | 2.50 | 22.28 | NONOCCURRENCE | NONOCCURRENCE | NONEXISTENCE |
| 1.306 | 0.6 | 1.306 | 1.00 | 1.50 | 2.50 | 23.41 | NONOCCURRENCE | NONOCCURRENCE | NONEXISTENCE |
| 1.325 | 0.6 | 1.325 | 1.00 | 1.50 | 2.50 | 24.52 | NONOCCURRENCE | NONOCCURRENCE | NONEXISTENCE |
| 1.344 | 0.6 | 1.344 | 1.00 | 1.50 | 2.50 | 25.61 | NONOCCURRENCE | NONOCCURRENCE | EXISTENCE |
| 1.364 | 0.6 | 1.364 | 1.00 | 1.50 | 2.50 | 26.68 | NONOCCURRENCE | NONOCCURRENCE | EXISTENCE |

FIG. 13

| MULTI-PLYING FACTOR | INSERTION RATE | RADIAL WIDTH OF INSERTING PORTION | RADIAL WIDTH OF GROOVE PORTION | PRESS INSERTION LENGTH OF INSERTING PORTION | DEPTH OF GROOVE PORTION | COM-PRESSION RATE | OCCURRENCE/ NONOCCURRENCE OF LEAKAGE IN INITIAL CONNECTION | OCCURRENCE/ NONOCCURRENCE OF LEAKAGE IN RECONNECTION | EXISTENCE/ NONEXISTENCE OF POSSIBILITY OF REMAINING OF SLEEVE |
|---|---|---|---|---|---|---|---|---|---|
| D1/D2 | L1/L2 | D1 mm | D2 mm | L1 mm | L2 mm | (D1-D2)/D1 % | | | |
| 1.026 | 0.4 | 1.026 | 1.00 | 1.00 | 2.50 | 2.55 | OCCURRENCE | OCCURRENCE | NONEXISTENCE |
| 1.052 | 0.4 | 1.052 | 1.00 | 1.00 | 2.50 | 4.98 | OCCURRENCE | OCCURRENCE | NONEXISTENCE |
| 1.079 | 0.4 | 1.079 | 1.00 | 1.00 | 2.50 | 7.29 | OCCURRENCE | OCCURRENCE | NONEXISTENCE |
| 1.105 | 0.4 | 1.105 | 1.00 | 1.00 | 2.50 | 9.49 | OCCURRENCE | OCCURRENCE | NONEXISTENCE |
| 1.131 | 0.4 | 1.131 | 1.00 | 1.00 | 2.50 | 11.60 | NONOCCURRENCE | NONOCCURRENCE | NONEXISTENCE |
| 1.158 | 0.4 | 1.158 | 1.00 | 1.00 | 2.50 | 13.62 | NONOCCURRENCE | NONOCCURRENCE | NONEXISTENCE |
| 1.184 | 0.4 | 1.184 | 1.00 | 1.00 | 2.50 | 15.55 | NONOCCURRENCE | NONOCCURRENCE | NONEXISTENCE |
| 1.211 | 0.4 | 1.211 | 1.00 | 1.00 | 2.50 | 17.41 | NONOCCURRENCE | NONOCCURRENCE | NONEXISTENCE |
| 1.238 | 0.4 | 1.238 | 1.00 | 1.00 | 2.50 | 19.20 | NONOCCURRENCE | NONOCCURRENCE | NONEXISTENCE |
| 1.264 | 0.4 | 1.264 | 1.00 | 1.00 | 2.50 | 20.92 | NONOCCURRENCE | NONOCCURRENCE | NONEXISTENCE |
| 1.292 | 0.4 | 1.292 | 1.00 | 1.00 | 2.50 | 22.57 | NONOCCURRENCE | NONOCCURRENCE | NONEXISTENCE |
| 1.319 | 0.4 | 1.319 | 1.00 | 1.00 | 2.50 | 24.18 | NONOCCURRENCE | NONOCCURRENCE | NONEXISTENCE |
| 1.346 | 0.4 | 1.346 | 1.00 | 1.00 | 2.50 | 25.72 | NONOCCURRENCE | NONOCCURRENCE | NONEXISTENCE |
| 1.374 | 0.4 | 1.374 | 1.00 | 1.00 | 2.50 | 27.22 | NONOCCURRENCE | NONOCCURRENCE | NONEXISTENCE |
| 1.402 | 0.4 | 1.402 | 1.00 | 1.00 | 2.50 | 28.67 | NONOCCURRENCE | NONOCCURRENCE | NONEXISTENCE |
| 1.430 | 0.4 | 1.430 | 1.00 | 1.00 | 2.50 | 30.08 | NONOCCURRENCE | NONOCCURRENCE | NONEXISTENCE |
| 1.459 | 0.4 | 1.459 | 1.00 | 1.00 | 2.50 | 31.44 | NONOCCURRENCE | NONOCCURRENCE | NONEXISTENCE |
| 1.487 | 0.4 | 1.487 | 1.00 | 1.00 | 2.50 | 32.77 | NONOCCURRENCE | NONOCCURRENCE | NONEXISTENCE |
| 1.516 | 0.4 | 1.516 | 1.00 | 1.00 | 2.50 | 34.06 | NONOCCURRENCE | NONOCCURRENCE | EXISTENCE |
| 1.546 | 0.4 | 1.546 | 1.00 | 1.00 | 2.50 | 35.32 | NONOCCURRENCE | NONOCCURRENCE | EXISTENCE |

FIG. 14

| MULTI-PLYING FACTOR | INSERTION RATE | RADIAL WIDTH OF INSERTING PORTION | RADIAL WIDTH OF GROOVE PORTION | PRESS INSERTION LENGTH OF INSERTING PORTION | DEPTH OF GROOVE PORTION | COM-PRESSION RATE | OCCURRENCE/ NONOCCURRENCE OF LEAKAGE IN INITIAL CONNECTION | OCCURRENCE/ NONOCCURRENCE OF LEAKAGE IN RECONNECTION | EXISTENCE/ NONEXISTENCE OF POSSIBILITY OF REMAINING OF SLEEVE |
|---|---|---|---|---|---|---|---|---|---|
| D1/D2 | L1/L2 | D1 | D2 | L1 | L2 | (D1-D2)/D1 | | | |
| | | mm | mm | mm | mm | % | | | |
| 1.031 | 0.3 | 1.031 | 1.00 | 0.75 | 2.50 | 2.96 | OCCURRENCE | OCCURRENCE | NONEXISTENCE |
| 1.061 | 0.3 | 1.061 | 1.00 | 0.75 | 2.50 | 5.76 | OCCURRENCE | OCCURRENCE | NONEXISTENCE |
| 1.092 | 0.3 | 1.092 | 1.00 | 0.75 | 2.50 | 8.40 | OCCURRENCE | OCCURRENCE | NONEXISTENCE |
| 1.122 | 0.3 | 1.122 | 1.00 | 0.75 | 2.50 | 10.90 | NONOCCURRENCE | OCCURRENCE | NONEXISTENCE |
| 1.153 | 0.3 | 1.153 | 1.00 | 0.75 | 2.50 | 13.28 | NONOCCURRENCE | NONOCCURRENCE | NONEXISTENCE |
| 1.184 | 0.3 | 1.184 | 1.00 | 0.75 | 2.50 | 15.54 | NONOCCURRENCE | NONOCCURRENCE | NONEXISTENCE |
| 1.215 | 0.3 | 1.215 | 1.00 | 0.75 | 2.50 | 17.69 | NONOCCURRENCE | NONOCCURRENCE | NONEXISTENCE |
| 1.246 | 0.3 | 1.246 | 1.00 | 0.75 | 2.50 | 19.74 | NONOCCURRENCE | NONOCCURRENCE | NONEXISTENCE |
| 1.277 | 0.3 | 1.277 | 1.00 | 0.75 | 2.50 | 21.70 | NONOCCURRENCE | NONOCCURRENCE | NONEXISTENCE |
| 1.309 | 0.3 | 1.309 | 1.00 | 0.75 | 2.50 | 23.58 | NONOCCURRENCE | NONOCCURRENCE | NONEXISTENCE |
| 1.340 | 0.3 | 1.340 | 1.00 | 0.75 | 2.50 | 25.38 | NONOCCURRENCE | NONOCCURRENCE | NONEXISTENCE |
| 1.372 | 0.3 | 1.372 | 1.00 | 0.75 | 2.50 | 27.11 | NONOCCURRENCE | NONOCCURRENCE | NONEXISTENCE |
| 1.404 | 0.3 | 1.404 | 1.00 | 0.75 | 2.50 | 28.78 | NONOCCURRENCE | NONOCCURRENCE | NONEXISTENCE |
| 1.436 | 0.3 | 1.436 | 1.00 | 0.75 | 2.50 | 30.38 | NONOCCURRENCE | NONOCCURRENCE | NONEXISTENCE |
| 1.469 | 0.3 | 1.469 | 1.00 | 0.75 | 2.50 | 31.92 | NONOCCURRENCE | NONOCCURRENCE | NONEXISTENCE |
| 1.502 | 0.3 | 1.502 | 1.00 | 0.75 | 2.50 | 33.41 | NONOCCURRENCE | NONOCCURRENCE | NONEXISTENCE |
| 1.535 | 0.3 | 1.535 | 1.00 | 0.75 | 2.50 | 34.85 | NONOCCURRENCE | NONOCCURRENCE | NONEXISTENCE |
| 1.569 | 0.3 | 1.569 | 1.00 | 0.75 | 2.50 | 36.25 | NONOCCURRENCE | NONOCCURRENCE | NONEXISTENCE |
| 1.603 | 0.3 | 1.603 | 1.00 | 0.75 | 2.50 | 37.60 | NONOCCURRENCE | NONOCCURRENCE | EXISTENCE |
| 1.637 | 0.3 | 1.637 | 1.00 | 0.75 | 2.50 | 38.91 | NONOCCURRENCE | NONOCCURRENCE | EXISTENCE |

RESIN-MADE PIPE JOINT

TECHNICAL FIELD

The present invention relates to a resin-made pipe joint.

BACKGROUND ART

As a resin-made pipe joint which is used for a tube for a fluid (for example, high purity liquid, ultrapure water, or chemical liquid) to be handled in a production process of various technical fields such as production of semiconductor devices, production of medical equipment and medicines, food processing, and chemical industry, for example, a resin-made pipe joint disclosed in Patent Literature 1 is known.

A resin-made pipe joint of this kind includes a joint body, an inner ring (sleeve), and a press ring (fastening member). The fastening member is configured by a union nut and the like so that the member can fasten a tube to be coupled to the resin-made pipe joint, to the joint body through the sleeve.

The joint body has a body cylinder portion, an outer cylinder portion, and an inner cylinder portion. The outer cylinder portion is coaxially projected from the body cylinder portion in one axial direction. The inner cylinder portion is placed radially inside the outer cylinder portion, and coaxially projected from the body cylinder portion in the same direction as the outer cylinder portion so that a projection end is located on the side of the body cylinder portion with respect to the projection end of the outer cylinder portion.

In the joint body, a groove portion which opens in one axial direction is formed while being surrounded by the body cylinder portion, the outer cylinder portion, and the inner cylinder portion.

The sleeve has a cylindrical fitting portion, a cylindrical coupling portion, a cylindrical inserting portion, and a cylindrical restricting portion. The fitting portion is configured so as to be detachably fitted to the radially inner side of the outer cylinder portion. The coupling portion is projected from the fitting portion in one axial direction, and configured so as to be press-inserted into a one longitudinal end portion of the tube.

The inserting portion is coaxially projected from the fitting portion in the other axial direction, and configured so as to be inserted into the groove portion of the joint body from the opening portion of the groove portion. The restricting portion is placed radially inside the inserting portion, and projected from the fitting portion in the same direction as the inserting portion so that the projection end is located on the side of the fitting portion with respect to the projection end of the inserting portion.

In the resin-made pipe joint, then, the tube is coupled to the sleeve, and thereafter the inserting portion is press-inserted into the groove portion while restricting deformational movement of the inner cylinder portion by the restricting portion, whereby the sleeve is connected to the joint body, and thereafter the tube is fastened to the joint body by using the fastening member, whereby the tube can be coupled to the resin-made pipe joint.

PRIOR ART LITERATURE

Patent Literature

Patent Literature 1: Japanese Patent Application Laid-Open No. 2000-283372

SUMMARY OF THE INVENTION

Problems to be Solved by the Invention

In the case where a tube is to be coupled to a such a conventional resin-made pipe joint, in connection of the sleeve and the joint body, in order to ensure the sealing property between the sleeve and the joint body, for example, the thickness (radial width) of the inserting portion of the sleeve is set to a value which is larger than the groove width (radial width) of the groove portion of the joint body, whereby the inserting portion is enabled to be strongly press-inserted into the groove portion.

In this configuration, press insertion was strongly performed as described above to couple the resin-made pipe joint to the tube, and this state was continued for years. In the case where, in order to detach the tube from the resin-made pipe joint because of maintenance, a change of facility layout, or another reason, the tube was thereafter pulled in the direction in which the tube is separated from the joint body, it was found that a state where the inserting portion does not slip off from the groove portion, and the sleeve remains to be left in the joint body was caused, and only the tube easily was detached from the joint body.

In the case where the detachment of only the tube from the joint body occurs, when the detached tube is to be again coupled to the resin-made pipe joint, the sleeve which remains to be connected to the joint body must be pulled out by using pliers or the like. This causes a possibility that the sleeve may be damaged. When the sleeve and tube which are once separated from each other as described above are recoupled together, there is a further possibility that the degree of close contact between the two members is reduced, and the sealing property between the two members is lowered. Therefore, it is substantially impossible to recouple the tube to the resin-made pipe joint.

Consequently, it can be said that, in the case where the coupled tube is detached because of maintenance, a change of facility layout, or another reason, there is a possibility that the recoupling of the detached tube is made impossible due to the state where the sleeve is separated from the tube to remain in the joint body.

Even in the case where the recoupling of the tube to the resin-made pipe joint can be easily performed, it is contemplated that, as a result of long-term use of the resin-made pipe joint, time elapses from the initial coupling and aging of the resin-made pipe joint proceeds, and there is a possibility that a sufficient sealing property cannot be attained between the sleeve and the joint body.

The invention is conducted in view of the above-discussed circumstances. It is an object of the invention to provide a resin-made pipe joint in which, after a coupled tube is detached, the tube can be recoupled surely and easily, and the sealing property between a joint body and a sleeve can be satisfactorily maintained even in the initial coupling of the tube, and also even in the recoupling of the tube.

Means for Solving the Problems

The invention of claim 1 is a resin-made pipe joint comprising:

a joint body having: a body cylinder portion in which a flow path for a fluid is formed; an outer cylinder portion which is coaxially projected from the body cylinder portion in one axial direction; and an inner cylinder portion which is placed radially inside the outer cylinder portion, and which is coaxially projected from the body cylinder portion in a same direction as the outer cylinder portion so that a projection end is located on a side of the body cylinder portion with respect to a projection end of the outer cylinder portion, a groove portion which opens in one axial direction being formed while being surrounded by the body cylinder portion, the outer cylinder portion, and the inner cylinder portion;

a sleeve having: a cylindrical fitting portion which is detachably fitted to a radially inner side of the outer cylinder portion; a cylindrical coupling portion which is projected from the fitting portion in one axial direction, and which is press-inserted into a one longitudinal end portion of the tube; and a cylindrical inserting portion which is coaxially projected from the fitting portion in another axial direction, and which is inserted into the groove portion from an opening portion of the groove portion, the sleeve being connectable to or detachable from the joint body in a state where the sleeve is coupled to the tube; and a fastening member which enables the tube to be fastened to the joint body through the sleeve, wherein the joint body and the sleeve are produced by using a fluorine resin, the inserting portion has a radial width which is larger than a radial width of the groove portion, and is configured to, when the fitting portion is to be fitted to the radially inner side of the outer cylinder portion, be press-inserted into the groove portion, a sealing portion which seals between an inner circumferential surface of the inserting portion and an outer circumferential surface of the inner cylinder portion is formed by press-inserting the inserting portion into the groove portion, and, when, with respect to the inserting portion and the groove portion, an insertion rate of the inserting portion to the groove portion is indicated by X, and a multiplying factor of the radial width of the inserting portion to the radial width of the groove portion is indicated by Y, the resin-made pipe joint has the insertion rate and multiplying factor which are within a range that is defined by following Expressions (1) and (2):

$$Y=-0.218X+1.218, \quad (1)$$

$$Y=-0.67X+1.67. \quad (2)$$

According to the configuration, when the tube is coupled (recoupled) to the resin-made pipe joint, the sealing portion which applies an adequate surface pressure between the joint body and sleeve that are connected to each other is formed, a sealing force is caused to radially act by the sealing portion, and an excellent sealing property can be ensured between the joint body and the sleeve.

Moreover, the sleeve is surely detached from the joint body, and, in a state where the tube and the sleeve remain to be coupled to each other, the tube can be detached from the resin-made pipe joint. The sleeve which is in the state where the sleeve remains to be coupled to the tube can be easily reconnected to the joint body, and the tube can be recoupled to the resin-made pipe joint.

When maintenance, a change of facility layout, or the like is to be performed, therefore, the tube which is detached from the resin-made pipe joint can be recoupled surely and easily. Even in the initial coupling of the resin-made pipe joint and the tube, and also even in the recoupling of the resin-made pipe joint and the tube, moreover, the sealing property of the sealing portion which is formed between the joint body and the sleeve can be satisfactorily maintained.

The invention of claim 2 has a configuration where, in the resin-made pipe joint of claim 1, a cylindrical restricting portion is disposed in the sleeve, the restricting portion having a first butting surface which faces in the axial direction, the restricting portion being placed radially inside the inserting portion, and projected from the fitting portion in a same direction as the inserting portion so that a projection end is located on a side of the fitting portion with respect to a projection end of the inserting portion, a second butting surface which is buttable against the first butting surface is disposed on the inner cylinder portion of the joint body, and, after the press insertion of the inserting portion into the groove portion is completed, the inner cylinder portion is clamped between the inserting portion and the restricting portion, to cause the first butting surface and the second butting surface to be press-contacted with each other, thereby forming a sealing portion which seals between the first butting surface and the second butting surface.

According to the configuration, when the tube is coupled to the resin-made pipe joint, the additional sealing portion which exerts a sealing force in the axial direction can be formed between the joint body and sleeve which are connected to each other, in addition to the sealing portion which causes the sealing force to radially act between the inserting portion and the inner cylinder portion. Therefore, an excellent sealing property can be stably realized between the joint body and the sleeve.

The invention of claim 3 has a configuration where, in the resin-made pipe joint of claim 1 or 2, the fastening member has: a cylindrical pressing portion which is to be fitted onto the tube movably in a longitudinal direction of the tube; and a cylindrical outer ring portion which is screwable to the outer cylinder portion of the joint body from a radially outer side, an expanding portion which, when the coupling portion of the sleeve is press-inserted into the tube, expands radially outwardly a part of the tube to be flared is disposed in the coupling portion, and, when the outer ring portion is screwed to the outer cylinder portion, the pressing portion presses the expanding portion toward the body cylinder portion to cause the inserting portion to be press-inserted into the groove portion.

According to the configuration, when the outer ring portion is screwed to the outer cylinder portion in order to fasten the tube to the joint body by using the fastening member, a longitudinal end portion of the tube into which the sleeve is press-inserted is pressed toward the expanding portion by the pressing portion, and the tube can be held in the state where the tube is pressingly contacted with the expanding portion. Therefore, the tube which is coupled to the resin-made pipe joint can be prevented from slipping off.

The invention of claim 4 has a configuration where, in the resin-made pipe joint of any one of claims 1 to 3, a projection end portion of the inserting portion is formed into a tapered shape in which an inner diameter of the projection end portion is larger as further advancing from the fitted side toward a side of the projection end.

According to the configuration, when the press insertion of the inserting portion into the groove portion is to be started in order to connect the sleeve to the joint body, the inserting portion is easily inserted from the projection end portion into the groove portion.

Effects of the Invention

According to the invention, it is possible to provide a resin-made pipe joint in which, after a coupled tube is detached, the tube can be recoupled surely and easily, and the sealing property between a joint body and a sleeve can be satisfactorily maintained even in the initial coupling of the tube, and also even in the recoupling of the tube.

BRIEF DESCRIPTION OF THE DRAWINGS

FIG. 5 is a view showing experimental results of Experimental example 1.

FIG. 6 is a view showing experimental results of Experimental example 2.

FIG. 7 is a view showing experimental results of Experimental example 3.

FIG. 8 is a view showing experimental results of Experimental example 4.

FIG. 9 is a view showing experimental results of Experimental example 5.

FIG. 10 is a view showing experimental results of Experimental example 6.

FIG. 11 is a view showing experimental results of Experimental example 7.

FIG. 12 is a view showing experimental results of Experimental example 8.

FIG. 13 is a view showing experimental results of Experimental example 9.

FIG. 14 is a view showing experimental results of Experimental example 10.

MODE FOR CARRYING OUT THE INVENTION

A preferred embodiment of the invention will be described with reference to the drawings.

Figure 1:
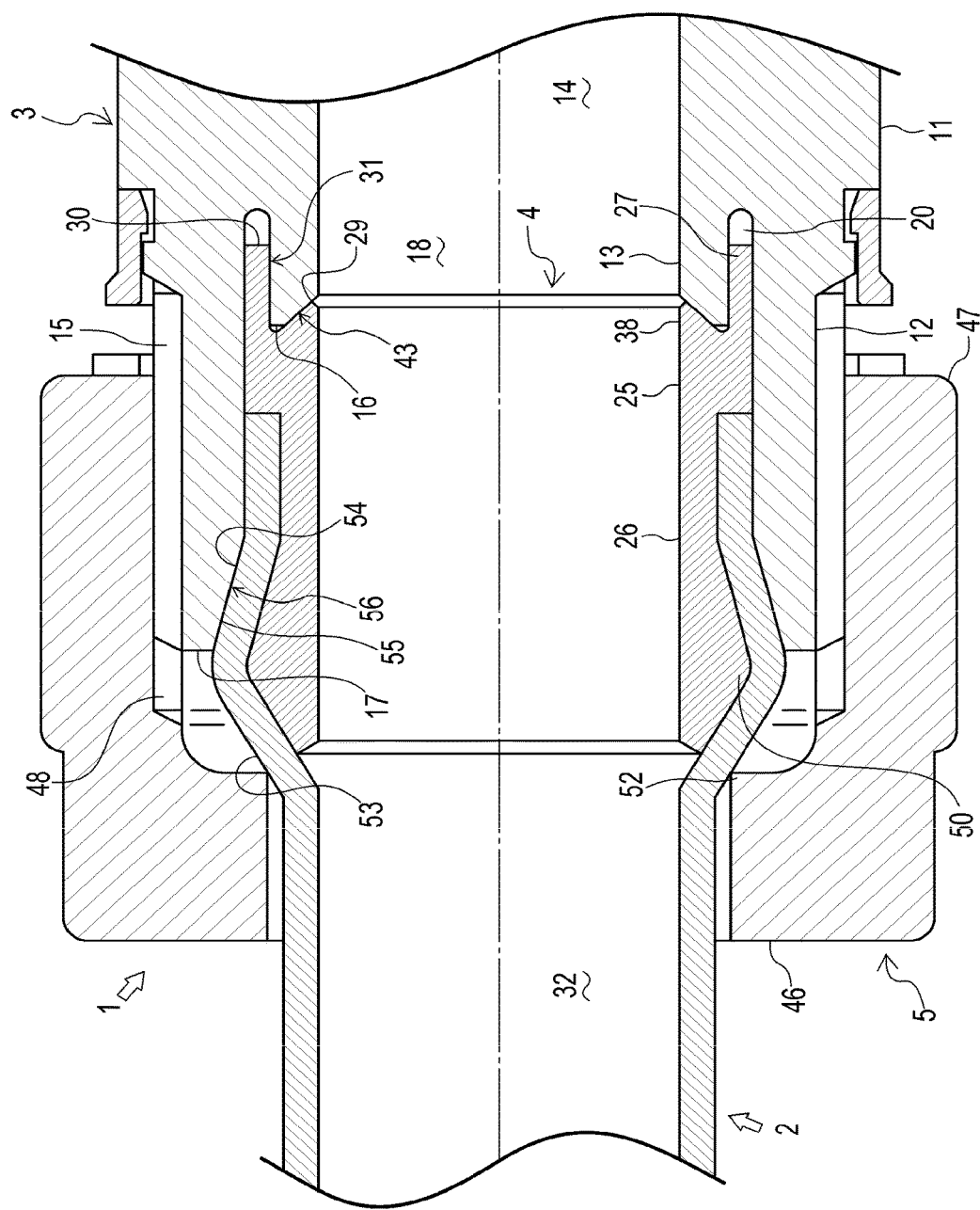
FIG. 1 is a sectional view of a resin-made pipe joint of an embodiment of the invention.
Figure 2:
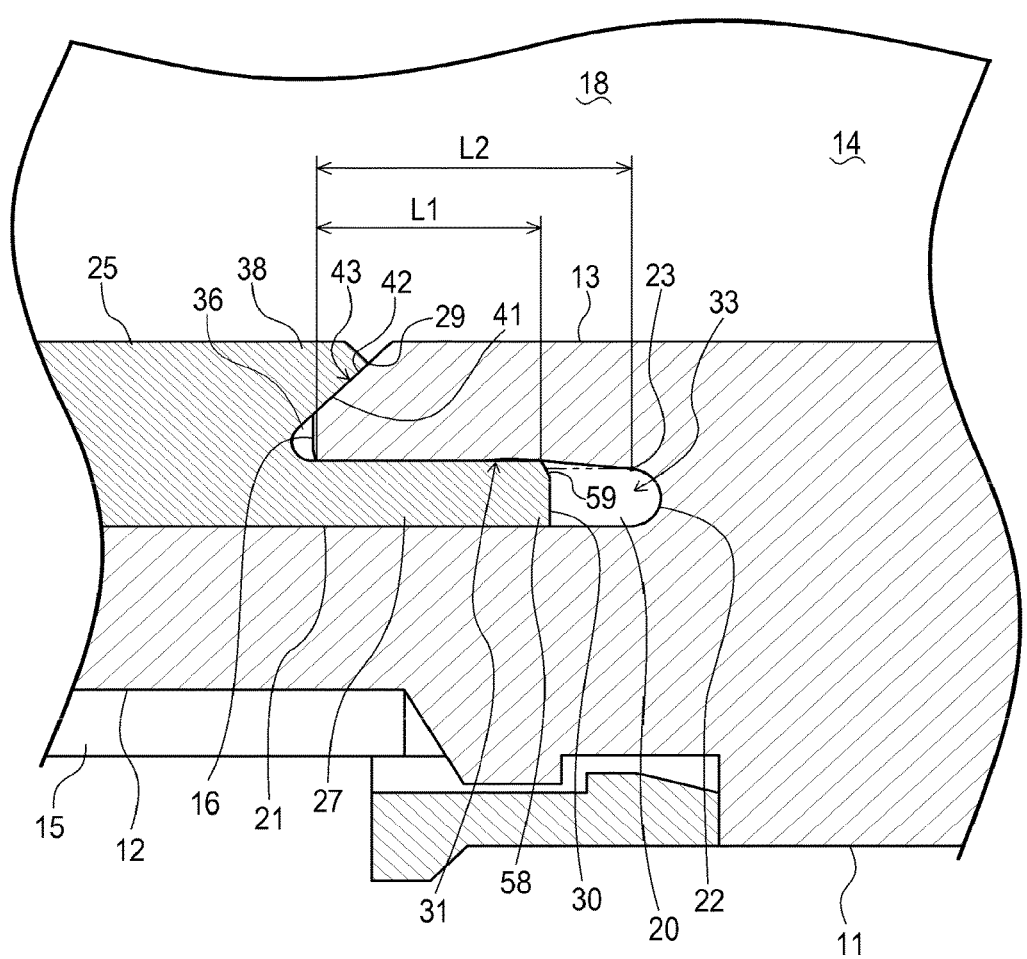
FIG. 2 is a partial enlarged view of FIG. 1.
Figure 3:
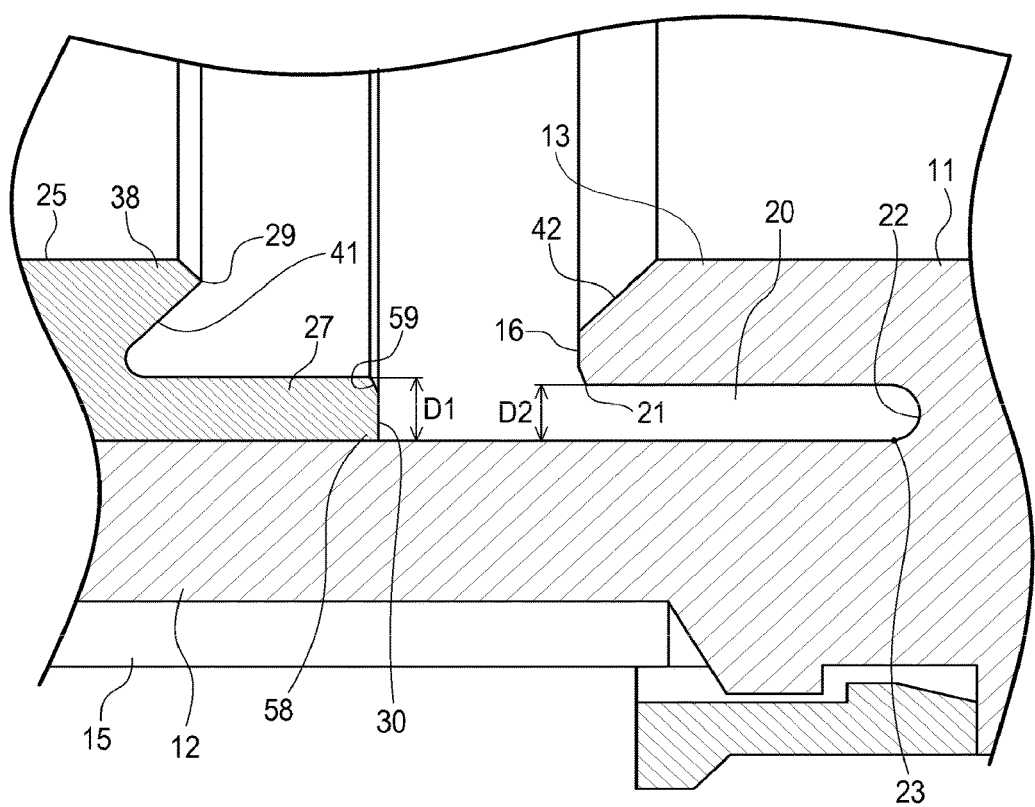
FIG. 3 is a sectional view showing a state where a connection between a joint body and sleeve in the resin-made pipe joint of FIG. 1 is canceled.

FIG. 1 is a sectional view of a resin-made pipe joint 1 of an embodiment of the invention, FIG. 2 is a partial enlarged view of FIG. 1, and FIG. 3 shows a state where a connection between a joint body 3 and sleeve 4 in the resin-made pipe joint 1 is canceled. FIG. 1 shows a state where the resin-made tube 2 is coupled to the resin-made pipe joint 1.

The resin-made pipe joint 1 is applied to a pipe joint which is made of a resin, in order to be used for connecting the tube 2 and another tube to each other, or disposed at a tube connecting position of a fluid apparatus (such as a valve or a pump) in order to connect the tube 2 to the fluid apparatus, and includes the joint body 3, the sleeve 4, and a fastening member 5.

The joint body 3 includes a body cylinder portion 11, an outer cylinder portion 12, and an inner cylinder portion 13. The joint body 3 is produced by using a fluorine resin, or, in the embodiment, PFA (perfluoroalkoxy alkane) or PTFE (polytetrafluoroethylene).

The body cylinder portion 11 has a flow path 14 for allowing a fluid such as a liquid to flow therethrough, in the body cylinder portion 11. In the embodiment, the body cylinder portion 11 is formed into a cylindrical shape. The flow path 14 is disposed so as to extend in the body cylinder portion 11 in the axial direction of the portion.

The outer cylinder portion 12 is coaxially projected from an axial end of the body cylinder portion 11 in one axial direction. In the embodiment, the outer cylinder portion 12 is formed into a cylindrical shape. An external thread 15 is disposed in the axial direction of the outer cylinder portion 12 on the outer circumferential surface of the outer cylinder portion 12.

The inner cylinder portion 13 is placed radially inside the outer cylinder portion 12. The inner cylinder portion 13 is coaxially projected from the one axial end of the body cylinder portion 11 in the same direction as the outer cylinder portion 12 so that a projection end 16 of the inner cylinder portion is located on the side of the body cylinder portion 11 with respect to a projection end 17 of the outer cylinder portion 12.

In the embodiment, the inner cylinder portion 13 is formed into a cylindrical shape which has an inner diameter that is substantially equal to that of the body cylinder portion 11, and which has an outer diameter that is smaller than the inner diameter of the outer cylinder portion 12. A flow path 18 is disposed so as to extend in the inner cylinder portion 13 in the axial direction of the portion, and connected to the flow path 14.

A groove portion 20 which is surrounded by the body cylinder portion 11, the outer cylinder portion 12, and the inner cylinder portion 13 is disposed in the joint body 3. In the embodiment, with respect to a radial direction, the groove portion 20 is placed so as to be sandwiched between the inner cylinder portion 13, and another axial end side (root side) of the outer cylinder portion 12 which is opposed to the inner cylinder portion.

The groove portion 20 is formed into an annular shape which extends over the whole outer circumferential surface of the inner cylinder portion 13 so that an opening portion 21 is disposed in the vicinity of the projection end 16 of the inner cylinder portion 13, and a closing portion 22 that is formed so as to have a recessed arcuate sectional shape is disposed on the one axial end side of the body cylinder portion 11.

The groove width D2 of the groove portion 20 is set to be smaller than the depth L2. The groove width D2 of the groove portion 20 is the radial width between the inner circumferential surface of the outer cylinder portion 12 and the outer circumferential surface of the inner cylinder portion 13 (see FIG. 3). The depth L2 of the groove portion 20 is the axial width extending from the opening portion 21 of the groove portion 20 to the closing portion 22 (specifically, a change starting portion 23 in which the groove width D2 starts to change) (see FIG. 2).

The sleeve 4 includes a fitting portion 25, a coupling portion 26, and an inserting portion 27. The sleeve 4 is configured so as to be connectable to or detachable from the joint body 3 in a state where the sleeve is coupled to the tube 2 by the coupling portion 26. The sleeve 4 is produced by using a fluorine resin, or, in the embodiment, PFA.

The fitting portion 25 is formed into a cylindrical shape, and configured so as to be detachably fitted to the radially inner side of the outer cylinder portion 12 of the joint body 3. In the embodiment, the fitting portion 25 is formed into a cylindrical shape which has an outer diameter that is substantially equal to the inner diameter of the outer cylinder portion 12, and which has an inner diameter that is substantially equal to the inner diameters of the inner cylinder portion 13 of the joint body 3 and the tube 2.

The coupling portion 26 is formed into a cylindrical shape, and configured so as to be projected from the fitting portion 25 in one axial direction, and press-insertable into one longitudinal end portion of the tube 2. In the embodiment, the coupling portion 26 is formed into a cylindrical shape which has an inner diameter that is substantially equal to the inner diameters of the fitting portion 25 and the tube 2.

The coupling portion 26 has an outer diameter that is smaller than that of the fitting portion 25, and that is larger than the inner diameter of the tube 2. The coupling portion 26 is configured so as to be detachably fittable to the radially inner side of the outer cylinder portion 12 through the longitudinal one end portion of the tube 2 in a state where the coupling portion is press-inserted into the longitudinal one end portion of the tube 2.

The inserting portion 27 is formed into a cylindrical shape, and configured so as to be coaxially projected from the fitting portion 25 in the other axial direction to be insertable into the groove portion 20 through the opening portion 21 of the groove portion. In the embodiment, the inserting portion 27 is formed into a cylindrical shape which has an outer diameter that is substantially equal to that of the fitting portion 25, and which has an inner diameter that is larger than that of the fitting portion 25.

The inserting portion 27 has an outer diameter that is substantially equal to the inner diameter of the outer cylinder portion 12, and an inner diameter that is smaller than the outer diameter of the inner cylinder portion 13. Namely, the inserting portion 27 has a thickness (radial width) D1 that is larger than the groove width D2 of the groove portion 20 (see FIG. 3). The inserting portion 27 is configured so as to be press-inserted into the groove portion 20 while pressing and compressively deforming the outer circumferential side of the inner cylinder portion 13.

The inserting portion 27 has a press insertion length L1 that, when the portion is inserted into the groove portion 20, is shorter than the depth L2 of the groove portion 20. Here, the press insertion length L1 of the inserting portion 27 means an axial width of a portion which is in the inner circumferential surface of the inserting portion 27, and which is in contact with the outer circumferential surface of the inner cylinder portion 13 in a state where the press insertion of the inserting portion 27 into the groove portion 20 is completed (see FIG. 2).

The fastening member 5 is configured so as to be able to fasten the tube 2 to the joint body 3 through the sleeve 4. In the embodiment, a union nut is used as the fastening member 5. The fastening member 5 will be described in detail later.

According to the configuration, when the following coupling work is performed, the tube 2 can be coupled to the resin-made pipe joint 1. In the coupling work, firstly, the coupling portion 26 is press-inserted into the one longitudinal end portion of the tube 2, thereby coupling the sleeve 4 to the tube 2.

Then, the inserting portion 27 is press-inserted into the groove portion 20, whereby the sleeve 4 which has been coupled to the tube 2 is connected to the joint body 3 so that a flow path 32 of the tube 2 communicates with the flow paths 14, 18. Finally, the tube 2 is fastened to the joint body 3 by using the fastening member 5.

In the case where the tube 2 is coupled to the resin-made pipe joint 1 as described above, when the inserting portion 27 is press-inserted into the groove portion 20, a first sealing portion 31 which seals between the inner circumferential surface of the inserting portion 27 and the outer circumferential surface of the inner cylinder portion 13 is formed as shown in FIGS. 1 and 2.

Figure 4:
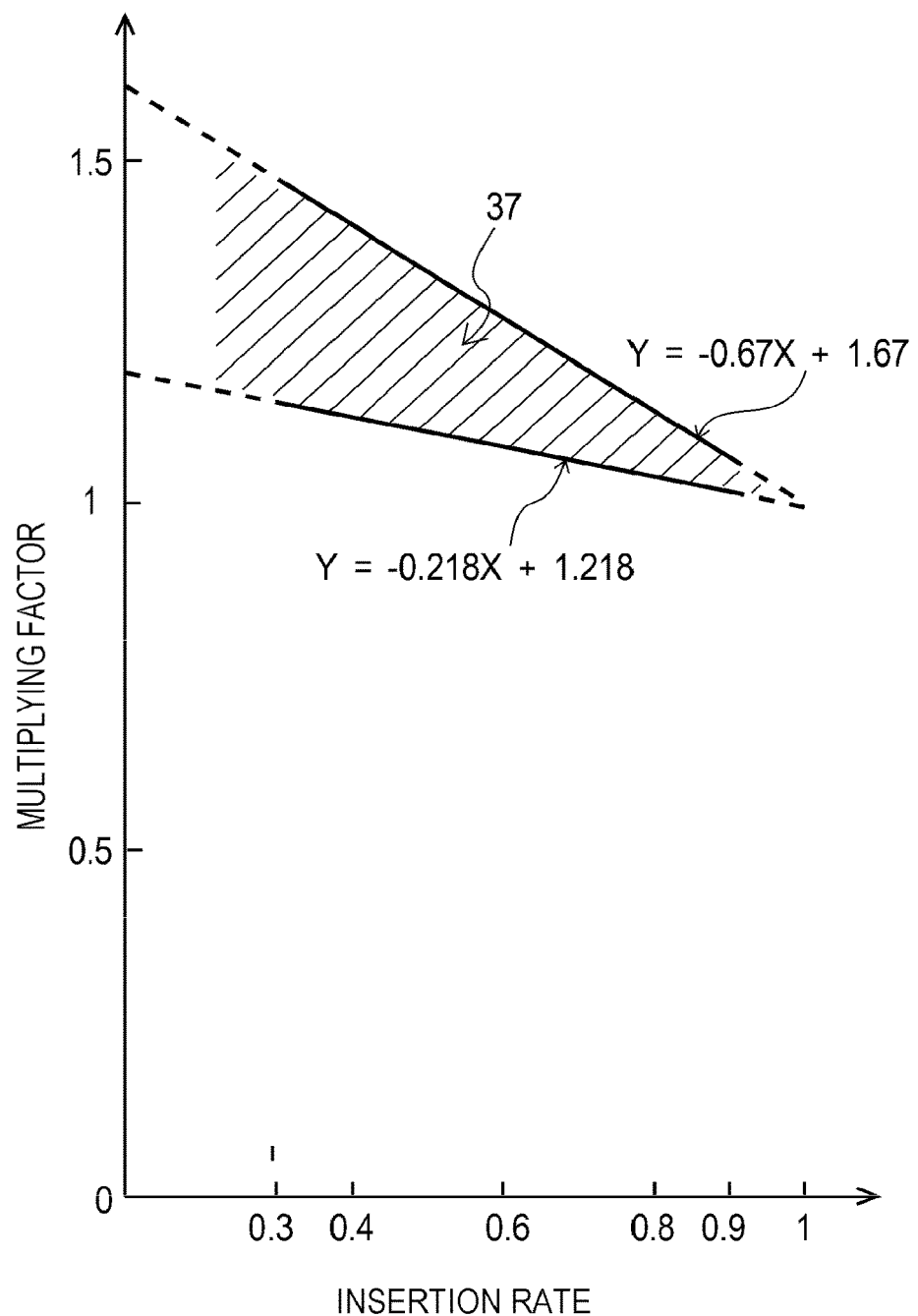
FIG. 4 is a view showing a part of relationships between a groove portion of a joint body and inserting portion of the sleeve in the resin-made pipe joint of FIG. 1.

In the embodiment, with respect to the inserting portion 27 and the groove portion 20, the insertion rate L1/L2 of the inserting portion 27 to the groove portion 20 is indicated by X, and the multiplying factor of the radial width D1 of the inserting portion to the radial width D2 of the groove portion 20 is indicated by Y, the shapes of the inserting portion 27 and the groove portion 20 are set so as to have an insertion rate and multiplying factor which are within a range (a range 37 in FIG. 4) that is defined by following Expressions (1) and (2):

$$Y=-0.218X+1.218, \quad (1)$$

$$Y=-0.67X+1.67. \quad (2)$$

Here, the above-described insertion rate L1/L2 is a rate of the press insertion length L1 of the inserting portion 27 at completion of the press insertion into the groove portion 20, to the depth L2 of the groove portion 20, and, preferably, is 20% or more, and further preferably 30% or more.

According to the configuration, when the tube 2 is coupled (recoupled) to the resin-made pipe joint 1, the first sealing portion 31 which applies an adequate surface pressure between the joint body 3 and sleeve 4 that are connected to each other is formed, a sealing force is caused to radially act by the sealing portion 31, and an excellent sealing property can be ensured between the joint body 3 and the sleeve 4.

In a state where the sleeve 4 is surely detached from the joint body 3, and the tube 2 remains to be coupled to the sleeve 4, moreover, the tube can be detached from the resin-made pipe joint 1. The sleeve 4 which is in the state where the sleeve remains to be coupled to the tube 2 can be easily reconnected to the joint body 3, and the tube 2 can be recoupled to the resin-made pipe joint 1.

When maintenance, a change of facility layout, or the like is to be performed, therefore, the tube 2 which is detached from the resin-made pipe joint 1 can be recoupled surely and easily. Even in the initial coupling of the resin-made pipe joint 1 and the tube 2, and also even in the recoupling of the resin-made pipe joint and the tube, moreover, the sealing property of the first sealing portion 31 which is formed between the joint body 3 and the sleeve 4 can be satisfactorily maintained.

With respect to the insertion rate and multiplying factor of the groove portion 20 and the inserting portion 27, findings were obtained from experimental results of Experimental examples 1 to 5 and Experimental examples 6 to 10.

A plurality of first resin-made pipe joints were prepared in Experimental example 1, a plurality of second resin-made pipe joints were prepared in Experimental example 2, a plurality of third resin-made pipe joints were prepared in Experimental example 3, a plurality of fourth resin-made pipe joints were prepared in Experimental example 4, and a plurality of fifth resin-made pipe joints were prepared in Experimental example 5. Each of the resin-made pipe joints includes a joint body and sleeve which are made of PFA.

In each of the experimental examples, the plurality of resin-made pipe joints were configured in a substantially same manner as the resin-made pipe joint 1 of the above-described embodiment, and then the pipe joints in which the multiplying factors of the radial width D1 of the inserting portion to the radial width D2 of the groove portion are different from one another were selectively used.

In Experimental examples 1 to 5, the insertion rates of the inserting portion to the groove portion were made different from one another in every experimental example. For the sake of convenience of the experiments, the insertion rate was 90% in Experimental example 1, 80% in Experimental example 2, 60% in Experimental example 3, 40% in Experimental example 4, and 30% in Experimental example 5.

Then, a leak test was conducted on the resin-made pipe joints (test pieces) of Experimental examples 1 to 5. The leak test was conducted after, in the to-be-used resin-made pipe joints, a groove portion through which a fluid can freely flow between the side of the flow path 18 and the space 36 was added to the butting portion between the inner cylinder portion 13 and the inserting portion 27 in FIG. 2 so that a second sealing portion 43 that will be described later does not function.

The leak test was conducted in order to check, in each of the test pieces, whether the fluid leaks in the first sealing portion or not when the joint body and the sleeve are initially connected to each other (occurrence/nonoccurrence of leakage in initial connection), and whether the fluid leaks in the first sealing portion or not when the joint body and the sleeve are reconnected to each other (occurrence/nonoccurrence of leakage in reconnection).

In the leak test, colored penetrant was enclosed in the flow path (the flow paths in the joint body and the sleeve) of each test piece, nitrogen gas of 1.4 MPa was applied to the enclosed penetrant, and the degree of penetration of the penetrant from the flow path to the first sealing portion through (the groove portion) between the joint body and the sleeve (whether part of the penetrant moves over the first sealing portion or not) was visually checked.

Usually, reconnection of the joint body and the sleeve (i.e., detachment and attachment of the sleeve) is performed after elapse of time from the initial connection. Therefore, occurrence/nonoccurrence of leakage in the reconnection in the test piece was checked after a change of restoring characteristics (creep deformation) due to internal stress or the like was caused in the joint body and the sleeve by alternately repeating ten times heating (150° C., one hour) and cooling (temperature of 25° C., six hours) on the joint body and sleeve which were used in the initial connection.

A plurality of sixth resin-made pipe joints were prepared in Experimental example 6, a plurality of seventh resin-made pipe joints were prepared in Experimental example 7, a plurality of eighth resin-made pipe joints were prepared in Experimental example 8, a plurality of ninth resin-made pipe joints were prepared in Experimental example 9, and a plurality of tenth resin-made pipe joints were prepared in Experimental example 10. Each of the resin-made pipe joints includes a joint body which is made of PTFE, and a sleeve which is made of PFA.

In each of the experimental examples, the plurality of resin-made pipe joints were configured in a substantially same manner as the resin-made pipe joint 1 of the above-described embodiment, and then the pipe joints in which the multiplying factors of the radial width D1 of the inserting portion to the radial width D2 of the groove portion are different from one another were selectively used.

In Experimental examples 6 to 10, the insertion rates of the inserting portion to the groove portion were made different from one another in every experimental example. For the sake of convenience of the experiments, the insertion rate was 90% in Experimental example 6, 80% in Experimental example 7, 60% in Experimental example 8, 40% in Experimental example 9, and 30% in Experimental example 10.

Then, a leak test was conducted on the resin-made pipe joints (test pieces) of Experimental examples 6 to 10 in the same manner as Experimental examples 1 to 5.

Furthermore, a repetitive coupling performance check test was conducted on the resin-made pipe joints (test pieces) of Experimental examples 1 to 10.

The repetitive coupling performance check test is conducted in order to check whether, after the coupled tube is detached from each of the test pieces of Experimental examples 1 to 10, the tube can be recoupled to the test piece surely and easily or not, or specifically, whether there is a possibility that, in the detachment of the tube, the tube is not detached from the groove portion and remains in the joint body or not (existence/nonexistence of possibility of remaining of sleeve).

FIGS. 5 to 14 show experimental results of the leak test and repetitive coupling performance check test of Experimental examples 1 to 10, respectively. When the multiplying factors of FIGS. 5 to 14 are plotted against the insertion rate, a correlation chart indicating relationships between the multiplying factor and the insertion rate. From the correlation chart, it is seen that, in common with Experimental examples 1 to 5 and Experimental examples 6 to 10, the condition where leakage in the initial connection, and that in the reconnection do not occur, and there is no possibility of remaining of the sleeve is attained by an insertion rate and a multiplying factor in a range 37 in FIG. 4 where Expression (1) above is set as the lower limit line, and Expression (2) above is set as the higher limit line.

In the embodiment, as shown in FIGS. 1, 2, and 3, the sleeve 4 has a restricting portion 38.

The restricting portion 38 is formed into a cylindrical shape, and placed radially inside the inserting portion 27. The restricting portion 38 is projected from the fitting portion 25 in the same direction as the inserting portion 27 so that the projection end 29 is located on the side of the fitting portion 25 with respect to the projection end 30 of the inserting portion 27.

The restricting portion 38 is configured so as to, in the press-insertion of the inserting portion 27 into the groove portion 20 of the joint body 3 from the opening portion 21 toward the closing portion 22, be located radially inside the inner cylinder portion 13 to restrict deformational movement of the inner cylinder portion 13 toward the radially inner side (toward the flow path 18), the inner cylinder portion being pressed by the inserting portion 27.

Then, a first sealing portion 31 which seals between the inner circumferential surface of the inserting portion 27 and the outer circumferential surface of the inner cylinder portion 13 is formed by press-inserting the inserting portion 27 into the groove portion 20 in the state where the above-mentioned deformational movement of the inner cylinder portion 13 is restricted by the restricting portion 38.

In the embodiment, the restricting portion 38 is formed into a cylindrical shape which has an inner diameter that is substantially equal to that of the fitting portion 25. The restricting portion 38 has an outer diameter that is smaller than the inner diameter of the inserting portion 27, so as to be able to clamp the side of the projection end 16 of the inner cylinder portion 13 between the restricting portion and the one axial direction side (root side) of the inserting portion 27 which is opposed to the restricting portion.

In this way, when the inserting portion 27 is press-inserted into the groove portion 20, the restricting portion 38 can support the inner cylinder portion 13 which is caused by the pressing of the inserting portion 27 to try to deform and move from the side of the projection end 16 toward the radially inner side with respect to the body cylinder portion 11 while compressively deforming the outer circumferential side, in the side of the projection end 16, thereby blocking the deformational movement of the inner cylinder portion 13 to the radially inner side.

A first butting surface 41 which faces in the axial direction is disposed on the restricting portion 38 of the sleeve 4. Specifically, the restricting portion 38 is formed into a tapered shape in which the outer diameter of the restricting portion is gradually reduced as further advancing from one axial side (root side) toward the other side (the side of the projection end 29). The first butting surface 41 is placed as a tapered surface radially outside the restricting portion 38. The first butting surface 41 is formed on the outer circumferential surface of the restricting portion 38.

A second butting surface 42 which is buttable against the first butting surface 41 is disposed on the inner cylinder portion 13 of the joint body 3. Specifically, the side of the projection end 16 of the inner cylinder portion 13 is formed into a tapered shape in which the inner diameter of the projection end is gradually expanded as further advancing from the other axial side (root side) toward the one side (the side of the projection end 16). The second butting surface 42 is placed as a tapered surface radially inside on the side of the projection end 16 of the inner cylinder portion 13. The second butting surface 42 is formed on the inner circumferential surface on the side of the projection end 16 of the inner cylinder portion 13.

As shown in FIGS. 1 and 2, the embodiment is configured so that, after the inserting portion 27 is press-inserted into the groove portion 20, the inner cylinder portion 13 is clamped between the inserting portion 27 and the restricting portion 38 so that the first butting surface 41 and the second butting surface 42 are press-contacted with each other, and a second sealing portion 43 which seals between the first butting surface 41 and the second butting surface 42 is formed.

According to the configuration, when the tube 2 is coupled to the resin-made pipe joint 1, the second sealing portion 43 which exerts a sealing force in the axial direction can be formed between the joint body 3 and sleeve 4 which are connected to each other, in addition to the first sealing portion 31 which causes the sealing force to radially act. Therefore, an excellent sealing property can be stably realized between the joint body 3 and the sleeve 4.

In the embodiment, as shown in FIG. 1, the fastening member 5 includes a pressing portion 46 and an outer ring portion 47. As described above, specifically, the fastening member 5 is a union nut, and produced by using PFA.

The pressing portion 46 is cylindrical, and configured so as to be fitted onto the tube 2 movably in the longitudinal direction of the tube. In the embodiment, the pressing portion 46 is formed into a cylindrical shape having an inner diameter which is substantially equal to or slightly larger than the outer diameter of the tube 2.

The outer ring portion 47 is configured so as to be screwable to the outer cylinder portion 12 of the joint body 3 from the radially outer side. In the embodiment, the outer ring portion 47 is formed into a cylindrical shape having an inner diameter which is larger than that of the pressing portion 46. The outer ring portion 47 is coaxially projected in the other axial direction from a portion of the pressing portion 46 which is close to the radially outer side.

The outer ring portion 47 has an inner diameter which is substantially equal to the outer diameter of the outer cylinder portion 12 in order to be able to surround the outer cylinder portion 12. An internal thread 48 corresponding to the external thread 15 of the outer cylinder portion 12 is disposed on the inner circumferential surface of the outer ring portion 47 along the axial direction of the outer ring portion 47. In this way, the outer ring portion 47 is screwable to the outer cylinder portion 12.

In the embodiment, an expanding portion 50 is disposed in the coupling portion 26 of the sleeve 4. The expanding portion 50 has a shape which, when the coupling portion 26 is press-inserted into one longitudinal end portion of the tube 2, can expand a part of the one longitudinal end portion of the tube 2 in a radially outer side so as to be flared.

The embodiment is configured so that, when the outer ring portion 47 of the fastening member 5 is screwed to the outer cylinder portion 12, the pressing portion 46 of the fastening member 5 presses the expanding portion 50 of the sleeve 4 toward the body cylinder portion 11 so as to cause the inserting portion 27 of the sleeve 4 to be press-inserted into the groove portion 20 of the joint body 3.

Specifically, the expanding portion 50 is formed into a recessed arcuate sectional shape. The expanding portion 50 is placed close to one axial end side of the coupling portion 26, and extends over the whole periphery of the outer circumferential surface of the coupling portion 26. The expanding portion 50 is configured so as to, when the coupling portion 26 is press-inserted into the tube 2, form a flared region in the one longitudinal end portion of the tube 2.

A third butting surface 53 which is buttable against an edge portion 52 that is located in the radially inside of and axially other side of the pressing portion 46 is formed in the flared region of the tube 2. The third butting surface 53 is placed in the flared region of the tube 2 and on the side of the one longitudinal end of the coupling portion 26, and formed into a tapered shape in which the outer diameter of the tube 2 is gradually reduced as further advancing from the other longitudinal end side toward the one end side.

According to the configuration, when the outer ring portion 47 of the fastening member 5 is screwed to the outer cylinder portion 12 in order to fasten the tube 2 to the joint body 3, the third butting surface 53 of the tube into which the sleeve 4 is press-inserted is pressed toward the expanding portion 50 by the pressing portion 46 (the edge portion 52) of the fastening member 5, and the tube 2 can be held in the state where the tube is pressingly contacted with the expanding portion 50. Therefore, the tube 2 which is coupled to the resin-made pipe joint 1 can be prevented from slipping off.

In the embodiment, as shown in FIG. 1, a fourth butting surface 54 is formed, in addition to the third butting surface 53, in the flared region of the tube 2. The fourth butting surface 54 is placed in the flared region of the tube 2 and on the side of the other longitudinal end of the coupling portion 26, and formed into a tapered shape in which the outer diameter of the tube 2 is gradually reduced as further advancing from the one longitudinal end side toward the other end side.

A fifth butting surface 55 which is buttable against the fourth butting surface 54 is disposed on the outer cylinder portion 12 of the joint body 3. The fifth butting surface 55 is placed in the vicinity of the projection end 17 of the outer cylinder portion 12, and in the radially inner side. The fifth butting surface 55 is formed into a tapered shape in which the inner diameter of the outer cylinder portion 12 is gradually expanded as further advancing from the other axial end side (root side) toward the one end side (the side of the projection end 17).

According to the configuration, when the outer ring portion 47 is screwed to the outer cylinder portion 12 in order to fasten the tube 2 to the joint body 3, the fourth butting surface 54 of the tube 2 into which the coupling portion 26 is press-inserted is pressed by the pressing portion 46 toward the fifth butting surface 55 through the sleeve 4, and a third sealing portion 56 can be formed between the tube 2 and the outer cylinder portion 12. Therefore, an excellent sealing property can be ensured between the tube 2 and the joint body 3.

In the embodiment, as shown in FIGS. 2 and 3, a projection end portion 58 of the inserting portion 27 is formed into a tapered shape in which the inner diameter of the projection end portion is larger as further advancing from the side of the fitting portion 25 (root side) toward the side of the projection end 30. Here, the radially inner side of the projection end portion 58 of the inserting portion 27 is chamfered, and a tapered chamfered portion 59 is disposed.

According to the configuration, when the press insertion of the inserting portion 27 into the groove portion 20 is to be started in order to connect the sleeve 4 to the joint body 3, the inserting portion 27 is easily inserted from the projection end portion 58 into the groove portion 20.

DESCRIPTION OF REFERENCE NUMERALS 1 resin-made pipe joint
2 tube
3 joint body
4 sleeve
5 fastening member
11 body cylinder portion
12 outer cylinder portion
13 inner cylinder portion
20 groove portion
25 fitting portion
26 coupling portion
27 inserting portion
31 first sealing portion
38 restricting portion
41 first butting surface
42 second butting surface
43 second sealing portion
46 pressing portion
47 outer ring portion
50 expanding portion
58 projection end portion of inserting portion

The invention claimed is:

1. A resin-made pipe joint comprising:
a joint body having: a body cylinder portion in which a flow path for a fluid is formed; an outer cylinder portion which is coaxially projected from the body cylinder portion in one axial direction; and an inner cylinder portion which is placed radially inside the outer cylinder portion, and which is coaxially projected from the body cylinder portion in a same direction as the outer cylinder portion so that a projection end is located on a side of the body cylinder portion with respect to a projection end of the outer cylinder portion, a groove portion which opens in one axial direction being formed while being surrounded by the body cylinder portion, the outer cylinder portion, and the inner cylinder portion;
a sleeve having: a cylindrical fitting portion which is detachably fitted to a radially inner side of the outer cylinder portion; a cylindrical coupling portion which is projected from the fitting portion in one axial direction, and which is press-inserted into a one longitudinal end portion of the tube; and a cylindrical inserting portion which is coaxially projected from the fitting portion in another axial direction, and which is inserted into the groove portion from an opening portion of the groove portion, the sleeve being connectable to or detachable from the joint body in a state where the sleeve is coupled to the tube; and
a fastening member which enables the tube to be fastened to the joint body through the sleeve, wherein
the joint body and the sleeve are produced by using a fluorine resin,
the inserting portion has a radial width which is larger than a radial width of the groove portion, and is configured to, when the fitting portion is to be fitted to the radially inner side of the outer cylinder portion, be press-inserted into the groove portion,
a sealing portion which seals between an inner circumferential surface of the inserting portion and an outer circumferential surface of the inner cylinder portion is formed by press-inserting the inserting portion into the groove portion, and,
when, with respect to the inserting portion and the groove portion, an insertion rate of the inserting portion to the groove portion is indicated by X, and a multiplying factor of the radial width of the inserting portion to the radial width of the groove portion is indicated by Y, the resin-made pipe joint has the insertion rate and multiplying factor which are within in a range that is defined by following Expressions (1) and (2):

$$Y=-0.218X+1.218, \qquad (1)$$

$$Y=-0.67X+1.67. \qquad (2)$$

2. The resin-made pipe joint according to claim 1, wherein a cylindrical restricting portion is disposed in the sleeve, the restricting portion having a first butting surface which faces in the axial direction, the restricting portion being placed radially inside the inserting portion, and projected from the fitting portion in a same direction as the inserting portion so that a projection end is located on a side of the fitting portion with respect to a projection end of the inserting portion,
a second butting surface which is buttable against the first butting surface is disposed on the inner cylinder portion of the joint body, and,
after the press insertion of the inserting portion into the groove portion is completed, the inner cylinder portion is clamped between the inserting portion and the restricting portion, to cause the first butting surface and the second butting surface to be press-contacted with each other, thereby forming a sealing portion which seals between the first butting surface and the second butting surface.

3. The resin-made pipe joint according to claim 2, wherein the fastening member has: a cylindrical pressing portion which is to be fitted onto the tube movably in a longitudinal direction of the tube; and a cylindrical outer ring portion which is screwable to the outer cylinder portion of the joint body from a radially outer side,
an expanding portion which, when the coupling portion of the sleeve is press-inserted into the tube, expands radially outwardly a part of the tube to be flared is disposed in the coupling portion, and,
when the outer ring portion is screwed to the outer cylinder portion, the pressing portion presses the expanding portion toward the body cylinder portion to cause the inserting portion to be press-inserted into the groove portion.

4. The resin-made pipe joint according to claim 3, wherein a projection end portion of the inserting portion is formed into a tapered shape in which an inner diameter of the projection end portion is larger as further advancing from the fitted side toward a side of the projection end.

5. The resin-made pipe joint according to claim 2, wherein a projection end portion of the inserting portion is formed into a tapered shape in which an inner diameter of the projection end portion is larger as further advancing from the fitted side toward a side of the projection end.

6. The resin-made pipe joint according to claim 1, wherein the fastening member has: a cylindrical pressing portion which is to be fitted onto the tube movably in a longitudinal direction of the tube; and a cylindrical outer ring portion which is screwable to the outer cylinder portion of the joint body from a radially outer side, an expanding portion which, when the coupling portion of the sleeve is press-inserted into the tube, expands radially outwardly a part of the tube to be flared is disposed in the coupling portion, and, when the outer ring portion is screwed to the outer cylinder portion, the pressing portion presses the expanding portion toward the body cylinder portion to cause the inserting portion to be press-inserted into the groove portion.

7. The resin-made pipe joint according to claim 6, wherein a projection end portion of the inserting portion is formed into a tapered shape in which an inner diameter of the projection end portion is larger as further advancing from the fitted side toward a side of the projection end.

8. The resin-made pipe joint according to claim 1, wherein a projection end portion of the inserting portion is formed into a tapered shape in which an inner diameter of the projection end portion is larger as further advancing from the fitted side toward a side of the projection end.

* * * * *